United States Patent
Huang et al.

(10) Patent No.: US 9,397,550 B2
(45) Date of Patent: Jul. 19, 2016

(54) SYSTEMS AND METHODS FOR OVER-TEMPERATURE PROTECTION AND OVER-VOLTAGE PROTECTION FOR POWER CONVERSION SYSTEMS

(71) Applicant: ON-BRIGHT ELECTRONICS (SHANGHAI) CO., LTD., Shanghai (CN)

(72) Inventors: Xiaomin Huang, Shanghai (CN); Huawei Lyu, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 141 days.

(21) Appl. No.: 14/075,303

(22) Filed: Nov. 8, 2013

(65) Prior Publication Data

US 2015/0085540 A1    Mar. 26, 2015

(30) Foreign Application Priority Data

Sep. 26, 2013   (CN) .......................... 2013 1 0450298

(51) Int. Cl.
*H02M 1/32* (2007.01)
*H02M 3/335* (2006.01)
(Continued)

(52) U.S. Cl.
CPC .............. *H02M 1/32* (2013.01); *H02H 7/1213* (2013.01); *H02M 3/33523* (2013.01); *H02H 5/042* (2013.01); *H02M 2001/327* (2013.01)

(58) Field of Classification Search
CPC . H02M 1/32; H02M 2001/327; H02M 3/335; H02M 3/33507; H02M 3/33523; H02H 7/12; H02H 7/1213
See application file for complete search history.

(56) References Cited

U.S. PATENT DOCUMENTS 7,149,098 B1 * 12/2006 Chen ....................... H02M 1/32
                                                          323/285
7,522,431 B2   4/2009 Huynh et al.
(Continued)

FOREIGN PATENT DOCUMENTS

CN       101282078 A    10/2008
CN       101800417 A     8/2010
(Continued)

OTHER PUBLICATIONS

Taiwan Patent Office, Office Action mailed Mar. 8, 2015, in Application No. 102140501.
(Continued)

*Primary Examiner* — Fred E Finch, III
(74) *Attorney, Agent, or Firm* — Jones Day

(57) ABSTRACT

Systems and methods are provided for protecting a power conversion system. A system controller includes a first controller terminal and a second controller terminal. The first controller terminal is configured to provide a drive signal to close and open a switch to affect a first current flowing through a primary winding of a power conversion system. The second controller terminal is configured to receive first input signals during one or more first switching periods and receive second input signals during one or more second switching periods. The system controller is configured to determine whether a temperature associated with the power conversion system is larger than a predetermined temperature threshold, and in response to the temperature associated with the power conversion system being larger than the predetermined temperature threshold, generate the drive signal to cause the switch open and remain open to protect the power conversion system.

36 Claims, 7 Drawing Sheets

(51) Int. Cl.
   *H02H 7/12*   (2006.01)
   *H02H 5/04*   (2006.01)

(56) References Cited

U.S. PATENT DOCUMENTS

| | | | |
|---|---|---|---|
| 2008/0157742 A1 | 7/2008 | Martin et al. | |
| 2011/0058287 A1* | 3/2011 | Conseil | H02M 1/08 361/18 |
| 2011/0095733 A1* | 4/2011 | Park | H02M 1/4225 323/207 |
| 2012/0013367 A1 | 1/2012 | Chen et al. | |
| 2012/0043954 A1 | 2/2012 | Lin et al. | |
| 2012/0206117 A1* | 8/2012 | Yang | H02H 5/042 323/282 |
| 2013/0083562 A1* | 4/2013 | Wu | H02M 1/32 363/16 |
| 2013/0121044 A1* | 5/2013 | Gao | H02M 3/33523 363/50 |
| 2013/0301302 A1* | 11/2013 | Wu | H02M 3/325 363/15 |
| 2014/0016378 A1* | 1/2014 | Ke | H02H 7/1213 363/21.18 |

FOREIGN PATENT DOCUMENTS

| | | |
|---|---|---|
| TW | 200411364 | 7/2004 |
| TW | I 225588 | 12/2004 |
| TW | 200713733 | 4/2007 |
| TW | I 310256 | 5/2009 |

OTHER PUBLICATIONS

Chinese Patent Office, Office Action mailed Sep. 2, 2015, in Application No. 201310450298.1.
Chinese Patent Office, Office Action mailed May 12, 2016, in Application No. 201310450298.1.

* cited by examiner

SYSTEMS AND METHODS FOR OVER-TEMPERATURE PROTECTION AND OVER-VOLTAGE PROTECTION FOR POWER CONVERSION SYSTEMS

1. CROSS-REFERENCES TO RELATED APPLICATIONS

This application claims priority to Chinese Patent Application No. 201310450298.1, filed Sep. 26, 2013, commonly assigned, incorporated by reference herein for all purposes.

2. BACKGROUND OF THE INVENTION

The present invention is directed to integrated circuits. More particularly, the invention provides systems and methods for system protections. Merely by way of example, the invention has been applied to over-temperature protection and over-voltage protection of power conversion systems. But it would be recognized that the invention has a much broader range of applicability.

Power conversion systems are often used in many electronic devices to provide power for the electronic devices to operate properly. To protect the electronic devices from being damaged under certain circumstances, many power conversion systems usually include certain protection mechanisms, such as over-temperature protection (OTP) and over-voltage protection (OVP). Oftentimes, a controller chip of a power conversion system uses two different terminals (e.g., pins) for OTP and OVP respectively. In certain controller chips, a terminal is used for OTP, and another terminal for current sensing (e.g., a CS terminal) is used for OVP. But the related OVP detection circuit may disturb the current sensing mechanism. In some controller chips, a single terminal (e.g., a pin) may be selected to perform OTP or selected to perform OVP, but cannot be selected to perform both OTP and OVP.

FIG. 1 is a simplified conventional diagram for over-temperature protection of a power conversion system. The power conversion system 10 includes a controller 12, a primary winding 14, a secondary winding 16, an auxiliary winding 18, a switch 20, resistors 22 and 24, diodes 26 and 28, capacitors 30 and 32, and a feedback component 34. The controller 12 includes terminals (e.g., pins) 36, 38, 40, 42, 44 and 46. For example, the switch 20 includes a field effect transistor. In another example, the switch 20 includes a bipolar junction transistor. In yet another example, the switch 20 includes an insulated-gate bipolar transistor.

As shown in FIG. 1, the resistor 22 is coupled to the terminal 36 (e.g., terminal OTP) for OTP detection. For example, the resistor 22 is a thermal resistor (e.g., a thermistor) that changes its resistance with temperature. As an example, the resistor 22 has a negative temperature coefficient, i.e., the resistance of the resistor 22 decreases with increasing temperatures. When the temperature of the power conversion system 10 is higher than a threshold temperature (e.g., $T_0$), the resistance of the resistor 22 becomes smaller than a threshold resistance (e.g., $R_0$), in some embodiments. For example, if a current 48 (e.g., $I_{OTP}$) flowing through the resistor 22 does not change in magnitude with temperature, a voltage drop across the resistor 22 is determined as follows:

$$V_{RT} = I_{OTP} \times R_0 \quad \text{(Equation 1)}$$

If the voltage drop across the resistor 22 is smaller in magnitude than a predetermined reference voltage, it is determined that the temperature of the power conversion system 10 is too high. For example, if the voltage drop across the resistor 22 remains smaller in magnitude than the predetermined reference voltage during a predetermined time period (e.g., N clock cycles), the OTP mechanism is triggered and the controller 12 changes a drive signal 50 to open (e.g., turn off) the switch 20 in order to power off the power conversion system 10. But the controller 12 cannot perform OTP detection and OVP detection using a single terminal (e.g., terminal 36).

The controller 12 includes no additional terminals other than the six terminals (e.g., the six pins) 36, 38, 40, 42, 44, and 46. For example, the terminal 38 (e.g., terminal $V_{CC}$) is used to receive a supply voltage for the controller 12, and the terminal 44 (e.g., terminal CS) is used to receive a current-sensing signal associated with a primary current flowing through the primary winding 14. In another example, the terminal 42 (e.g., terminal GND) is biased at a ground voltage, and the terminal 40 (e.g., terminal GATE) is used to output the drive signal to open (e.g., turn off) and/or close (e.g., turn on) the switch 20. Alternatively, the controller 12 includes one or more additional terminals (e.g., one or more additional pins) other than the six terminals (e.g., the six pins) 36, 38, 40, 42, 44, and 46.

Hence it is highly desirable to improve the technique for achieving OTP and OVP in power conversion systems.

3. BRIEF SUMMARY OF THE INVENTION

The present invention is directed to integrated circuits. More particularly, the invention provides systems and methods for system protections. Merely by way of example, the invention has been applied to over-temperature protection and over-voltage protection of power conversion systems. But it would be recognized that the invention has a much broader range of applicability.

According to one embodiment, a system controller for protecting a power conversion system includes, a first controller terminal configured to provide a drive signal to close and open a switch to affect a first current flowing through a primary winding of a power conversion system, the drive signal being associated with one or more switching periods including one or more first switching periods and one or more second switching periods, and a second controller terminal configured to receive one or more first input signals during the one or more first switching periods and receive one or more second input signals during the one or more second switching periods. The system controller is configured to, process information associated with the first input signals, determine whether a temperature associated with the power conversion system is larger than a predetermined temperature threshold based on at least information associated with the first input signals, and in response to the temperature associated with the power conversion system being larger than the predetermined temperature threshold, generate the drive signal to cause the switch open and remain open to protect the power conversion system. The system controller is further configured to, process information associated with the second input signals, determine whether an output voltage associated with a secondary winding of the power conversion system is larger than a predetermined voltage threshold based on at least information associated with the second input signals, and in response to the output voltage associated with the secondary winding of the power conversion system being larger than the predetermined voltage threshold, generate the drive signal to cause the switch to open and remain open to protect the power conversion system.

According to another embodiment, a system for protecting a power conversion system includes, a system controller including a first controller terminal configured to provide a drive signal to close and open a switch to affect a first current flowing through a primary winding of a power conversion system, and a second controller terminal configured to receive one or more input signals, the power conversion system further including a secondary winding and an auxiliary winding, the primary winding coupled to the secondary winding, a first resistor including a first resistor terminal and a second resistor terminal, the first resistor terminal being coupled to the second controller terminal, one or more first diodes including a first diode terminal and a second diode terminal, a first diode terminal being coupled to the second controller terminal, and a second resistor including a third resistor terminal and a fourth resistor terminal, the third resistor terminal being coupled to the second diode terminal. The second resistor terminal is configured to receive an output signal associated with the auxiliary winding coupled to the secondary winding.

According to yet another embodiment, a system controller for protecting a power conversion system includes, a first controller terminal configured to provide a drive signal to close and open a switch to affect a first current flowing through a primary winding of a power conversion system, the drive signal being associated with one or more switching periods including a first switching period and a second switching period; and a protection component configured to receive a first voltage signal associated with a first input current flowing through a resistor during the first switching period and receive a second voltage signal associated with a second input current flowing through the resistor during the second switching period, the first input current and the second input current being different in magnitude. The protection component is further configured to, in response to a difference between the first voltage signal and the second voltage signal being larger than a predetermined threshold in magnitude, output a protection signal to generate the drive signal to cause the switch to open and remain open to protect the power conversion system.

According to yet another embodiment, a system controller for protecting a power conversion system includes, a first controller terminal configured to receive an input current, a first resistor configured to receive a first current and the input current and generate a first voltage based on at least information associated with the first current and the input current, a second resistor configured to receive a second current and generate a second voltage based on at least information associated with the second current, and a processing component configured to, in response to the first voltage becoming larger than a first voltage threshold in magnitude, increase the second voltage in magnitude, discharge a capacitor coupled to the processing component, and decrease a third voltage in magnitude associated with the capacitor.

In one embodiment, a method for protecting a power conversion system includes, providing a drive signal to close and open a switch to affect a first current flowing through a primary winding of a power conversion system, the drive signal being associated with one or more switching periods including one or more first switching periods and one or more second switching periods, receiving one or more first input signals during the one or more first switching periods, processing information associated with the one or more first input signals, and determining whether a temperature associated with the power conversion system is larger than a predetermined temperature threshold based on at least information associated with the one or more first input signals. The method further includes, in response to the temperature associated with the power conversion system being larger than the predetermined temperature threshold, generating the drive signal to cause the switch open and remain open to protect the power conversion system, receiving one or more second input signals during the one or more second switching periods, processing information associated with the one or more second input signals, determining whether an output voltage associated with a secondary winding of the power conversion system is larger than a predetermined voltage threshold based on at least information associated with the one or more second input signals, and in response to the output voltage associated with the secondary winding of the power conversion system being larger than the predetermined voltage threshold, generating the drive signal to cause the switch to open and remain open to protect the power conversion system.

In another embodiment, a method for protecting a power conversion system includes, providing a drive signal to close and open a switch to affect a first current flowing through a primary winding of a power conversion system, the drive signal being associated with one or more switching periods including a first switching period and a second switching period, receiving a first voltage signal associated with a first input current flowing through a resistor during the first switching period, receiving a second voltage signal associated with a second input current flowing through the resistor during the second switching period, the first input current and the second input current being different in magnitude, and in response to a difference between the first voltage signal and the second voltage signal being larger than a predetermined threshold in magnitude, outputting a protection signal to generate the drive signal to cause the switch to open and remain open to protect the power conversion system.

In yet another embodiment, a method for protecting a power conversion system includes, receiving an input current and a first current, processing information associated with the input current and the first current, and generating a first voltage based on at least information associated with the first current and the input current. The method additionally includes, receiving a second current, processing information associated with the second current, and generating a second voltage based on at least information associated with the second current. The method further includes, in response to the first voltage becoming larger than a first voltage threshold in magnitude, increasing the second voltage in magnitude, discharging a capacitor, and decreasing a third voltage in magnitude associated with the capacitor.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for system protections. Merely by way of example, the invention has been applied to over-temperature protection and over-voltage protection of power conversion systems. But it would be recognized that the invention has a much broader range of applicability.

The fabrication cost of a controller chip may increase if different terminals (e.g., pins) are assigned for OTP and OVP respectively. In addition, it is difficult to enclose two separate terminals (e.g., pins) for OTP and OVP in certain chip packaging. But the single terminal may not be used to achieve both OTP and OVP simultaneously.

Figure 1:
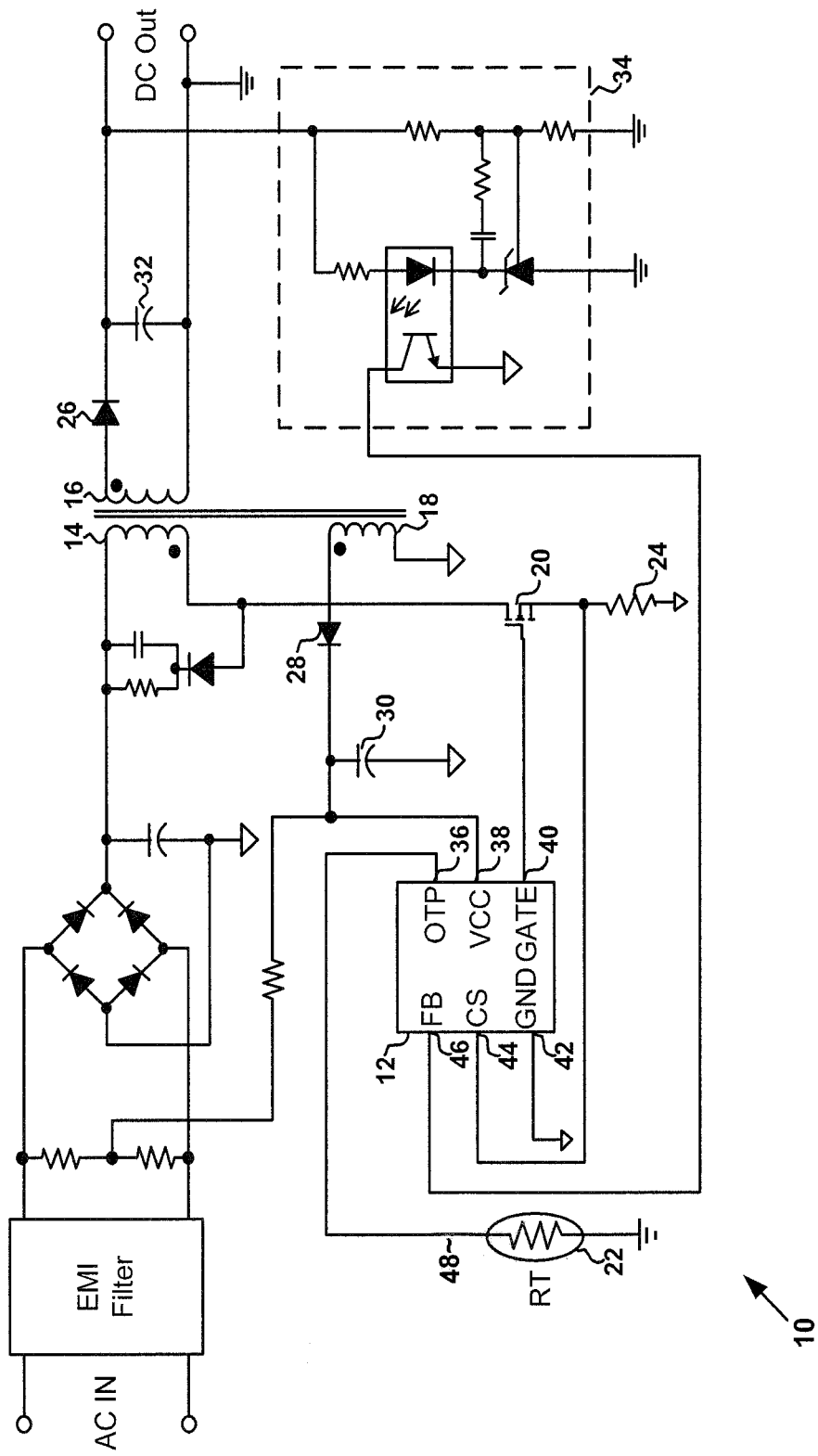
FIG. 1 is a simplified conventional diagram for over-temperature protection of a power conversion system.
Figure 2:
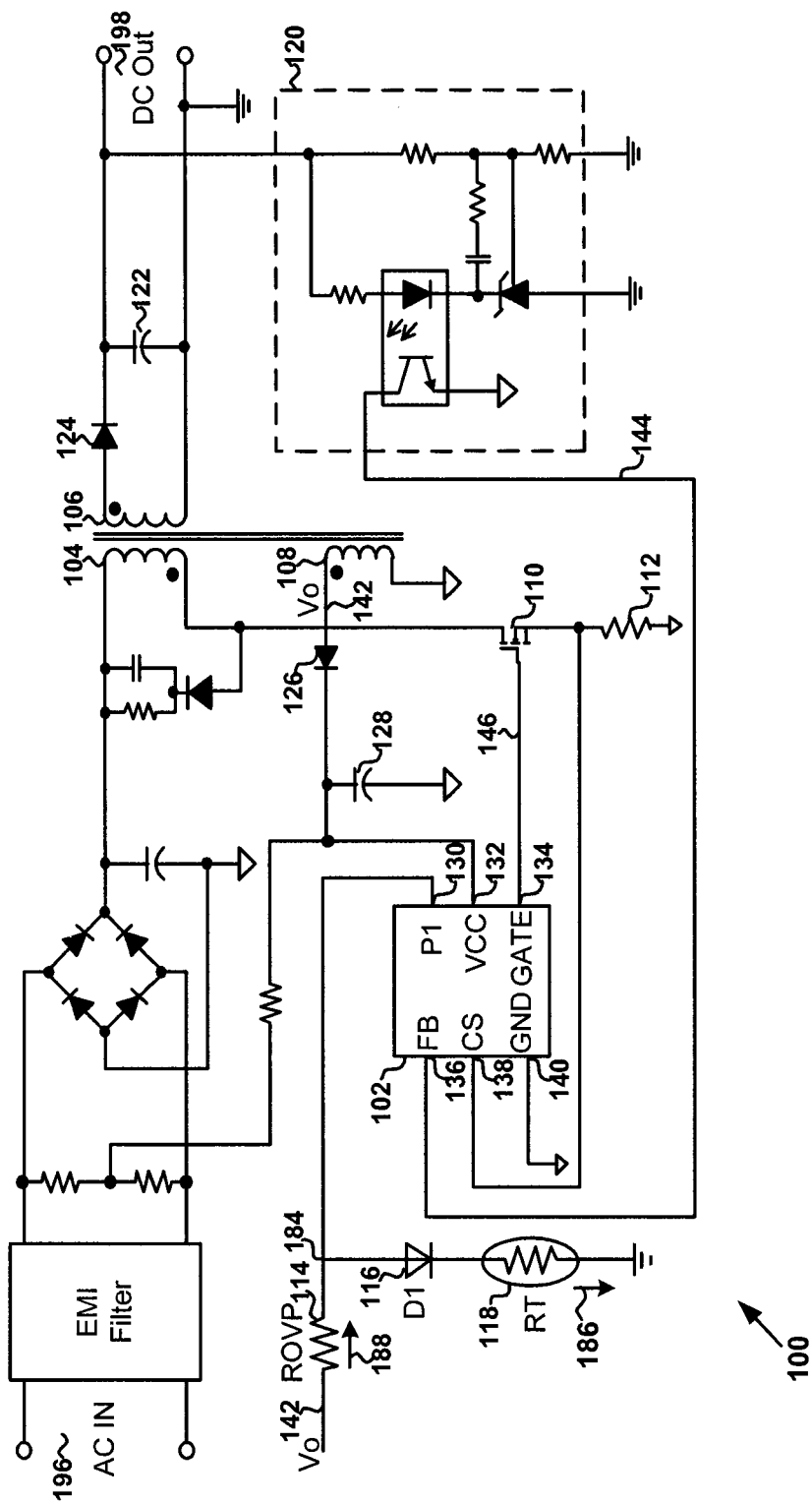
FIG. 2 is a simplified diagram for over-temperature protection and over-voltage protection of a power conversion system using one terminal according to one embodiment of the present invention.

FIG. 2 is a simplified diagram for over-temperature protection and over-voltage protection of a power conversion system using one terminal according to one embodiment of the present invention. This diagram is merely an example, which should not unduly limit the scope of the claims. One of ordinary skill in the art would recognize many variations, alternatives, and modifications.

The power conversion system 100 includes a controller 102, a primary winding 104, a secondary winding 106, an auxiliary winding 108, a switch 110, resistors 112, 114 and 118, diodes 116, 124 and 126, capacitors 122 and 128, and a feedback component 120. The controller 102 includes terminals (e.g., pins) 130, 132, 134, 136, 138 and 140. For example, the switch 110 includes a field effect transistor. In another example, the switch 110 includes a bipolar junction transistor. In yet another example, the switch 110 includes an insulated-gate bipolar transistor. The diode 116 is replaced with a number of diodes connected in series, in some embodiments. As an example, the auxiliary winding 108 is coupled to the secondary winding 106. In another example, the primary winding 104 is coupled to the secondary winding 106.

According to one embodiment, a transformer including the primary winding 104 and the secondary winding 106 is used to isolate an input voltage 196 on the primary side and an output voltage 198 on the secondary side. For example, the feedback component 120 transmits a feedback signal 144 associated with the output voltage 198 from the secondary side to the terminal 136 (e.g., terminal FB) of the controller 102. As an example, the feedback component 120 includes TL431 and an opto-coupler. When the switch 110 is closed (e.g., being turned on), energy is stored in the primary winding 104, and when the switch 110 is opened (e.g., being turned off), the energy stored in the primary winding 110 is released to the secondary side, in some embodiments.

According to another embodiment, the terminal 130 of the controller 102 is used to achieve both over-temperature protection (OTP) and over-voltage protection (OVP). For example, during a first time period (e.g., a switching period), the terminal 130 is configured to receive a first input signal, and whether the OTP mechanism is triggered is determined based on at least information associated with the first input signal. In another example, and during a second time period (e.g., another switching period) that is different from the first time period, the terminal 130 is configured to receive a second input signal, and whether the OVP mechanism is triggered is determined based on at least information associated with the second input signal.

As shown in FIG. 2, the terminal 130 is connected to the resistor 114 and the diode 116 (e.g., the anode) and the resistor 118 (e.g., $R_T$) is connected to the diode 116 (e.g., the cathode), in some embodiments. For example, the resistor 114 is configured to receive a voltage signal 142 from the auxiliary winding 108. As an example, the voltage signal 142 maps the output voltage 198. In another example, the resistor 118 is a thermal resistor (e.g., a thermistor) that changes its resistance with temperature. In yet another example, the resistor 118 has a negative temperature coefficient, i.e., the resistance of the resistor 118 decreases with increasing temperatures.

In certain embodiments, if the temperature of the power conversion system 100 exceeds a temperature threshold, the OTP is triggered, and the controller 102 outputs, at the terminal 134 (e.g., terminal GATE), a drive signal 146 to open (e.g., turn off) the switch 110. For example, the power conversion system 100 is shut down and the switch 110 keeps open. In another example, after being shut down, the system 100 restarts (e.g., automatically or manually) and starts modulation again. In yet another example, the switch 110 keeps open for a first predetermined time period that is larger in duration than a switching period of the system 100.

In some embodiments, if the voltage signal 142 exceeds a voltage threshold, the OVP is triggered, and the controller 102 outputs the drive signal 146 to open (e.g., turn off) the switch 110. For example, the power conversion system 100 is shut down and the switch 110 keeps open. In another example, after being shut down, the system 100 restarts (e.g., automatically or manually) and starts modulation again. In yet another example, the switch 110 keeps open for a second predetermined time period that is larger in duration than a switching period of the system 100.

The controller 102 includes no additional terminals other than the six terminals (e.g., the six pins) 130, 132, 134, 136, 138 and 140 in some embodiments. For example, the terminal 132 (e.g., terminal $V_{CC}$) is used to receive a supply voltage for the controller 102, and the terminal 138 (e.g., terminal CS) is used to receive a current-sensing signal associated with a primary current flowing through the primary winding 104. In another example, the terminal 140 (e.g., terminal GND) is biased at a ground voltage, and the terminal 134 (e.g., terminal GATE) is used to output the drive signal 146 to open (e.g., turn off) and/or close (e.g., turn on) the switch 110. In certain embodiments, the controller 102 includes one or more additional terminals (e.g., one or more additional pins) other than the six terminals (e.g., the six pins) 130, 132, 134, 136, 138 and 140.

Figure 3:
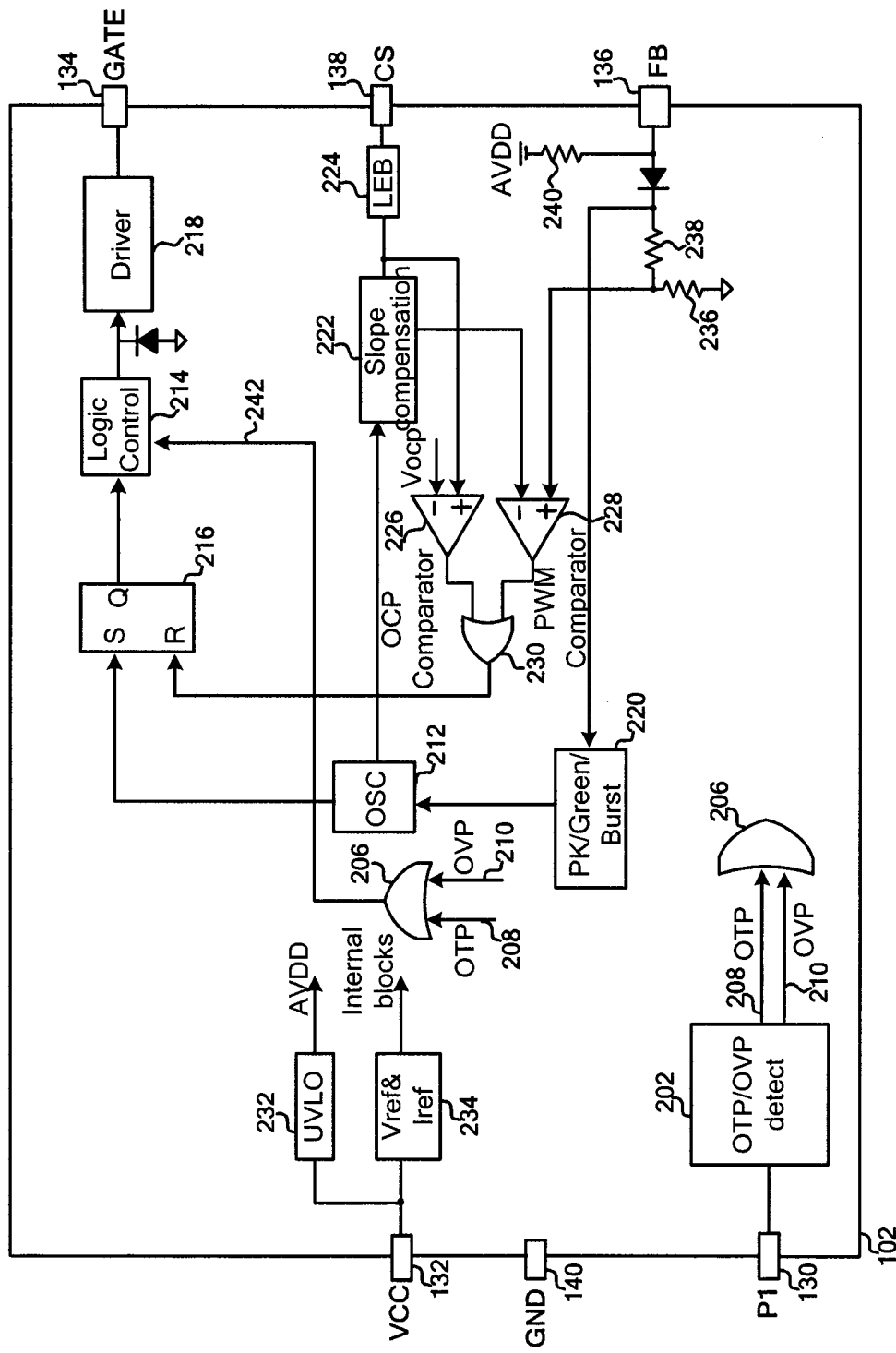
FIG. 3 is a simplified diagram for a controller as part of a power conversion system as shown in FIG. 2 according to one embodiment of the present invention.

FIG. 3 is a simplified diagram for the controller 102 as part of the power conversion system 100 according to one embodiment of the present invention. This diagram is merely an example, which should not unduly limit the scope of the claims. One of ordinary skill in the art would recognize many variations, alternatives, and modifications.

The controller 102 includes a detection component 202, OR gates 206 and 230, an oscillator 212, a logic controller 214, a flip-flop component 216, and a driving component 218. In addition, the controller 102 includes a PK/Green/Burst component 220, a slope-compensation component 222, a leading-edge-blanking (LEB) component 224, comparators 226 and 228, an under-voltage lock-out (UVLO) component 232, a reference-signal generator 234, and resistors 236, 238 and 240. In certain embodiments, the OR gate 206 is included in the logic controller 214.

According to one embodiment, the terminal 130 (e.g., terminal P1) provides one or more input signals to the detection component 202 which generates an OTP-detection signal 208 and an OVP-detection signal 210 to the OR gate 206. For example, the OR gate 206 outputs a signal 242 to the logic controller 214 to affect the status of the switch 110.

Whether the OVP mechanism is triggered is determined based on at least information associated with a current 188 (e.g., $I_{OVP}$) flowing through the resistor 114, in certain embodiments. For example, if the current 188 becomes larger in magnitude than a threshold current, it is determined that the output voltage of the power conversion system 100 is too high. As an example, if the current 188 keeps larger in magnitude than the threshold current during another predetermined time period (e.g., M clock cycles), the OVP mechanism is triggered and the controller 102 changes the drive signal 146 to open (e.g., turn off) the switch 110 in order to power off the power conversion system 100. In some embodiments, the diode 116 serves to reduce a leakage current flowing from the resistor 118 toward the terminal 130 (e.g., terminal P1) during the OVP detection. In addition, a voltage 184 (e.g., $V_1$) associated with the terminal 130 (e.g., terminal P1) is kept approximately smaller in magnitude than a turn-on voltage (e.g., a forward voltage) of the diode 116.

Figure 4:
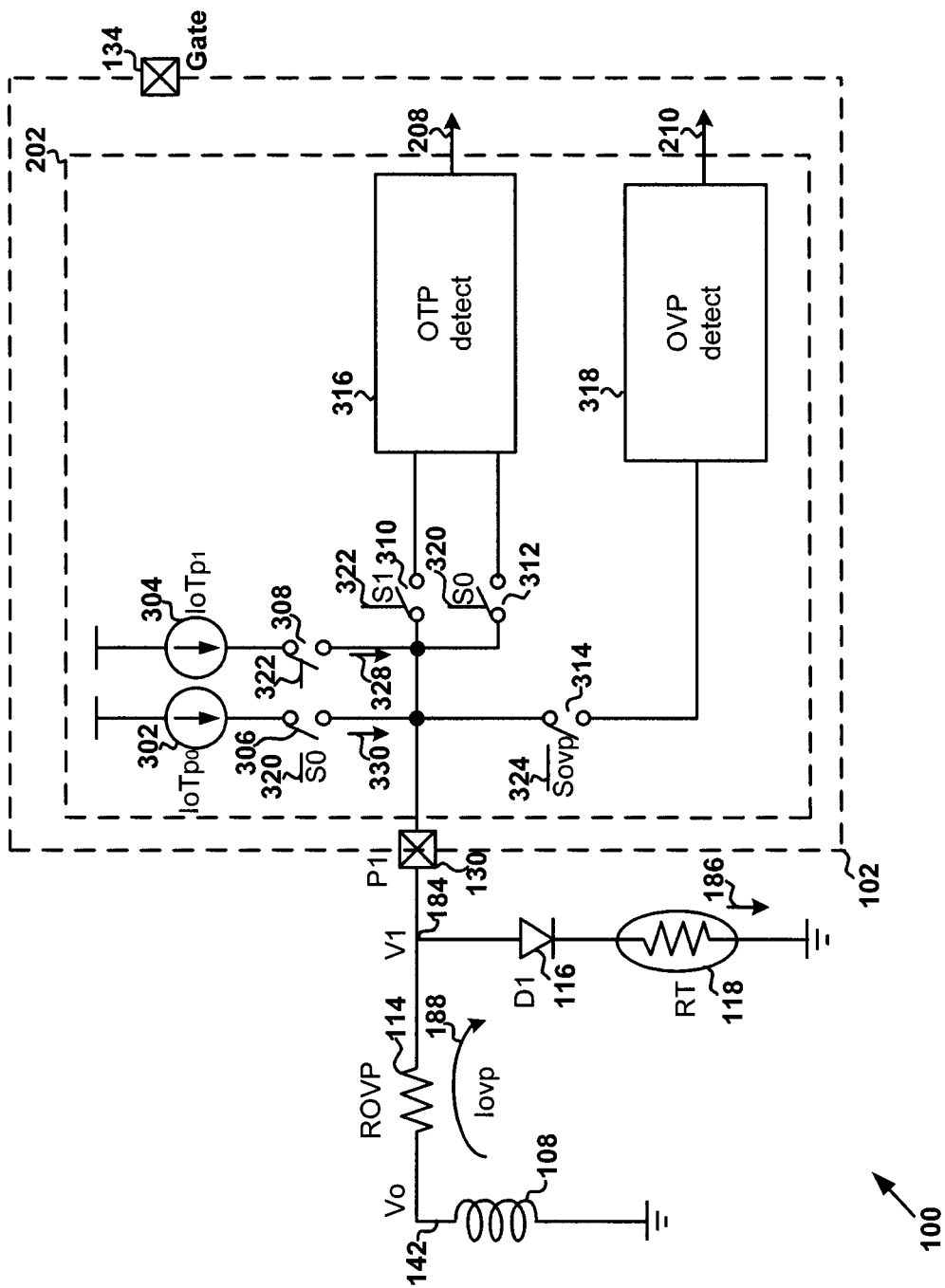
FIG. 4 is a simplified diagram showing certain components of a power conversion system as shown in FIG. 2 according to one embodiment of the present invention.

FIG. 4 is a simplified diagram showing certain components of the power conversion system 100 according to one embodiment of the present invention. This diagram is merely an example, which should not unduly limit the scope of the claims. One of ordinary skill in the art would recognize many variations, alternatives, and modifications. As shown in FIG. 4, the detection component 202 includes current-source components 302 and 304, switches 306, 308, 310, 312 and 314, an OTP detector 316, and an OVP detector 318.

According to one embodiment, the switches 306 and 312 are closed or opened in response to a switching signal 320 (e.g., $S_0$), and the switches 308 and 310 are closed or opened in response to a switching signal 322 (e.g., $S_1$). For example, the switch 314 is closed or opened in response to a switching signal 324 (e.g., $S_{ovp}$). The OVP detection and the OTP detection are performed during different switching periods by controlling the switches 306, 308, 310, 312 and 314 in some embodiments.

Figure 5:
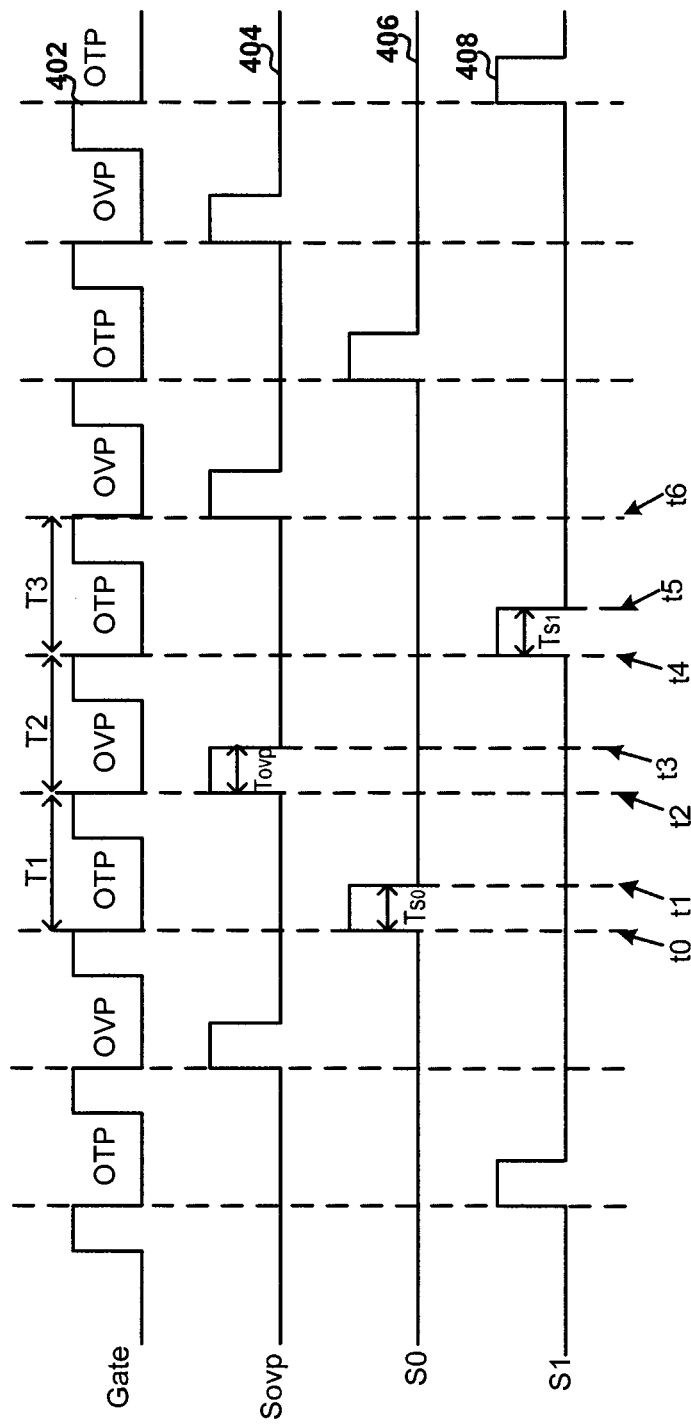
FIG. 5 is a simplified timing diagram for a power conversion system as shown in FIG. 2 according to one embodiment of the present invention.

FIG. 5 is a simplified timing diagram for the power conversion system 100 according to one embodiment of the present invention. This diagram is merely an example, which should not unduly limit the scope of the claims. One of ordinary skill in the art would recognize many variations, alternatives, and modifications. The waveform 402 represents the drive signal 146 as a function of time, the waveform 404 represents the switching signal 324 (e.g., $S_{ovp}$) as a function of time, the waveform 406 represents the switching signal 320 (e.g., $S_0$) as a function of time, and the waveform 408 represents the switching signal 322 (e.g., $S_1$) as a function of time. The OVP detection and the OTP detection are performed alternately during different switching periods in certain embodiments.

Three switching periods are shown in FIG. 5, $T_1$, $T_2$, and $T_3$. The switching period $T_1$ starts at time $t_0$ and ends at time $t_2$, the switching period $T_2$ starts at the time $t_2$ and ends at time $t_4$, and the switching period $T_3$ starts at the time $t_4$ and ends at time $t_6$. In addition, within the first switching period $T_1$, a time period $T_{S0}$ starts at the time $t_0$ and ends at time $t_1$. A time period $T_{OVP}$ within the second switching period $T_2$ starts at the time $t_2$ and ends at time $t_3$. Further, a time period $T_{S1}$ within the third switching period $T_3$ starts at the time $t_4$ and ends at time $t_5$. For example, $t_0 \leq t_1 \leq t_2 \leq t_3 \leq t_4 \leq t_5 \leq t_6$. As shown in FIG. 5, the OTP detection is performed during the switching period $T_1$ and $T_3$, and the OVP detection is performed during the switching period $T_2$.

As shown in FIG. 4 and FIG. 5, at the beginning of the switching period $T_1$ (e.g., at $t_0$), the drive signal 146 changes from a logic high level to a logic low level, and the switch 110 is opened (e.g., being turned off), according to one embodiment. For example, the switching signal 320 (e.g., $S_0$) changes from the logic low level to the logic high level and keeps at the logic high level during the time period $T_{S0}$ (e.g., until $t_1$), and the switches 306 and 312 are closed (e.g., being turned on). As an example, the current-source component 302 provides a current 330 (e.g., $I_{OTP0}$) for OTP detection.

According to another embodiment, at the beginning of the switching period $T_2$ (e.g., at $t_2$), the drive signal 146 changes from the logic high level to the logic low level, and the switch 110 is opened (e.g., being turned off). As an example, the voltage signal 142 is related to the output voltage 198 when the drive signal 146 is at the logic low level. For example, the switching signal 324 (e.g., $S_{OVP}$) changes from the logic low level to the logic high level and keeps at the logic high level during the time period $T_{OVP}$ (e.g., until $t_3$), and the switch 314 is closed (e.g., being turned on). In another example, the current 188 flows through the resistor 114 and the terminal 130 (e.g., terminal P1), and is received by the OVP detector 318 for OVP detection.

According to yet another embodiment, at the beginning of the switching period $T_3$ (e.g., at $t_4$), the drive signal 146 changes from the logic high level to the logic low level, and the switch 110 is opened (e.g., being turned off). For example, the switching signal 322 (e.g., $S_1$) changes from the logic low level to the logic high level and keeps at the logic high level during the time period $T_{S1}$ (e.g., until $t_5$), and the switches 308 and 310 are closed (e.g., being turned on). As an example, the current-source component 304 provides a current 328 (e.g., $I_{OTP1}$) for OTP detection.

In one embodiment, the OTP detection is achieved based on at least information associated with the voltage signal 184. For example, the current 188 (e.g., $I_{OVP}$) is determined as follows:

$$I_{OVP} = \frac{V_o - V_1}{R_{OVP}} \quad \text{(Equation 2)}$$

where $V_o$ represents the voltage signal 142, $V_1$ represents the voltage signal 184, and $R_{OVP}$ represents the resistance of the resistor 114. As an example, the voltage signal 184 is determined as follows:

$$V_1 = V_D + (I_{OVP} + I_{OTP}) \times R_T \quad \text{(Equation 3)}$$

where $V_D$ represents a turn-on voltage (e.g., a forward voltage) of the diode 116, $I_{OTP}$ represents the current 186, and $R_T$ represents the resistance of the resistor 118.

Combining Equation 2 and Equation 3, the voltage signal 184 is determined as follows:

$$V_1 = \frac{R_{OVP}}{R_{OVP} + R_T} \times V_D \frac{R_T}{R_{OVP} + R_T} \times V_o + \frac{R_T \times R_{OVP}}{R_{OVP} + R_T} \times I_{OTP} \quad \text{(Equation 4)}$$

Assuming the turn-on voltage (e.g., a forward voltage) of the diode 116 does not change with the current 186, a change of the voltage signal 184 between different time periods for OTP detection is determined as follows, according to certain embodiments:

$$\Delta V_1 = V_1(S_0) - V_1(S_1) = \frac{R_T \times R_{OVP}}{R_{OVP} + R_T} \times \Delta I_{OTP} \quad \text{(Equation 5)}$$

where $V_1(S_0)$ represents a magnitude of the voltage signal 184 during the time period $T_{S0}$, $V_1(S_1)$ represents a magnitude of the voltage signal 184 during the time period $T_{S1}$, and $\Delta I_{OTP}$ represents a change of the current 186 between the time periods $T_{S0}$ and $T_{S1}$. For example, the change of the current 186 between the time periods $T_{S0}$ and $T_{S1}$ is determined as follows:

$$\Delta I_{OTP} = I_{OPT0} - I_{OPT1} \quad \text{(Equation 6)}$$

where $I_{OPT0}$ represents the current 330, and $I_{OPT1}$ represents the current 328.

As discussed above and further emphasized here, FIG. 4 and FIG. 5 are merely examples, which should not unduly limit the scope of the claims. One of ordinary skill in the art would recognize many variations, alternatives, and modifications. For example, the time period $T_{OVP}$ precedes both the time period $T_{S0}$ and the time period $T_{S1}$. In another example, the time period $T_{OVP}$ follows both the time period $T_{S0}$ and the time period $T_{S1}$. In yet another example, the switching period $T_3$ that includes the time period $T_{S1}$ immediately follows the switching period $T_1$ that includes the time period $T_{S0}$. In yet another example, the switching period $T_1$ that includes the time period $T_{S0}$ follows immediately the switching period $T_3$ that includes the time period $T_{S1}$. In yet another example, the switching period $T_3$ that includes the time period $T_{S1}$ is separated from the switching period $T_1$ that includes the time period $T_{S0}$ by one or more switching periods. In yet another example, the switching period $T_2$ that includes the time period $T_{OVP}$ immediately follows the switching period $T_3$ that includes the time period $T_{S1}$. In yet another example, the switching period $T_2$ that includes the time period $T_{OVP}$ is separated from the switching period $T_1$ that includes the time period $T_{S0}$ by one or more switching periods. In yet another example, the switching period $T_2$ that includes the time period $T_{OVP}$ is separated from the switching period $T_3$ that includes the time period $T_{S1}$ by one or more switching periods.

Figure 6:
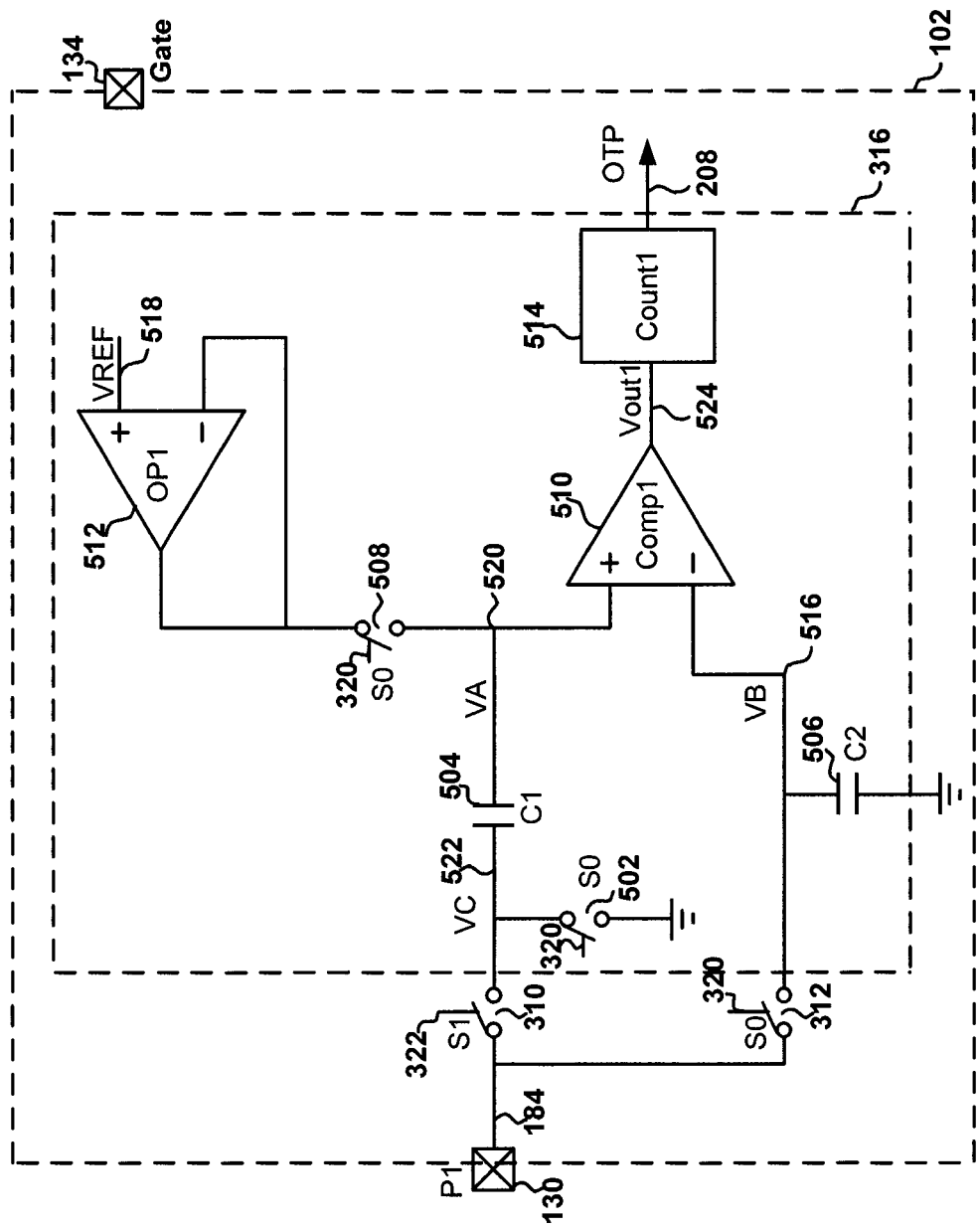
FIG. 6 is a simplified diagram showing certain components of an over-temperature-protection detector as part of a detection component in a controller as shown in FIG. 2 according to one embodiment of the present invention.

FIG. 6 is a simplified diagram showing certain components of the OTP detector 316 as part of the detection component 202 in the controller 102 according to one embodiment of the present invention. This diagram is merely an example, which should not unduly limit the scope of the claims. One of ordinary skill in the art would recognize many variations, alternatives, and modifications. As shown in FIG. 6, the OTP detector 316 includes switches 502 and 508, capacitors 504 and 506, a comparator 510, an amplifier 512, and a counter component 514. For example, the switches 502 and 508 are closed or opened in response to the switching signal 320 (e.g., $S_0$).

According to one embodiment, during the first time period (e.g., the time period $T_{S0}$), when the switch 312 is closed, the capacitor 506 is charged in response to the voltage signal 184 until a voltage 516 received at an inverting terminal (e.g., the "−" terminal) of the comparator 510 is approximately equal in magnitude to the voltage signal 184. For example, the voltage signal 184 is sampled at the capacitor 506. In another example, the amplifier 512 receives a reference signal 518 (e.g., $V_{REF}$) at a non-inverting terminal (e.g., the "+" terminal). In yet another example, the switches 502 and 508 are closed (e.g., being turned on) in response to the switching signal 320, and the switch 310 is opened (e.g., being turned off) in response to the switching signal 322. As an example, the capacitor 504 is charged until a voltage 520 received at a non-inverting terminal (e.g., the "+" terminal) of the comparator 510 is approximately equal in magnitude to the reference signal 518.

According to another embodiment, during a second time period (e.g., the time period $T_{S1}$), when the switch 310 is closed, the switches 312, 502 and 508 are opened (e.g., being turned off) in response to the switching signal 320. For example, a voltage 522 at a terminal of the capacitor 504 is approximately equal in magnitude to the voltage signal 184. In another example, the other terminal of the capacitor 504 is floating, and the voltage 520 at the non-inverting terminal of the comparator 510 is determined as follows:

$$V_A = V_{REF} + V_1(S_1) \quad \text{(Equation 7)}$$

where $V_{REF}$ represents the reference signal 518, and $V_1(S_1)$ represents the voltage signal 184 during the second time period. In yet another example, the voltage 516 at the inverting terminal of the comparator 510 is kept at approximately the voltage signal 184 during the first time period.

According to yet another embodiment, when the voltage 520 is larger in magnitude than the voltage 516 as follows:

$$V_1(S_0) - V_1(S_1) < V_{REF} \quad \text{(Equation 8)}$$

where $V_1(S_0)$ represents the voltage signal 184 during the first time period, and $V_1V(S_1)$ represents the voltage signal 184 during the second time period, it indicates that the temperature of the power conversion system 100 is higher than a temperature threshold. For example, the comparator 510 generates a signal 524 at a logic high level. In another example, if the signal 524 is kept at the logic high level for a predetermined time period (e.g., a predetermined number of clock cycles), the counter component 514 outputs the OTP-detection signal 208 (e.g., at the logic high level) to trigger the OTP protection.

Combining Equation 5 and Equation 8, the condition for OTP protection is determined as follows, according to some embodiments:

$$\frac{R_T \times R_{OVP}}{R_{OVP} + R_T} \times \Delta I_{OTP} < V_{REF} \quad \text{(Equation 9)}$$

where $\Delta I_{OTP}$ represents a change of the current 186 between the first time period (e.g., the time period $T_{S0}$) and the second time period (e.g., the time period $T_{S1}$). For example, when the temperature of the power conversion system 100 is higher than the temperature threshold, the resistance of the resistor 114 (i.e., $R_{OVP}$) is much larger than the resistance of the resistor 118 (i.e., $R_T$). The condition for OTP protection is determined as follows, according to certain embodiments:

$$R_T \times \Delta I_{OTP} < V_{REF} \quad \text{(Equation 10)}$$

Figure 7:
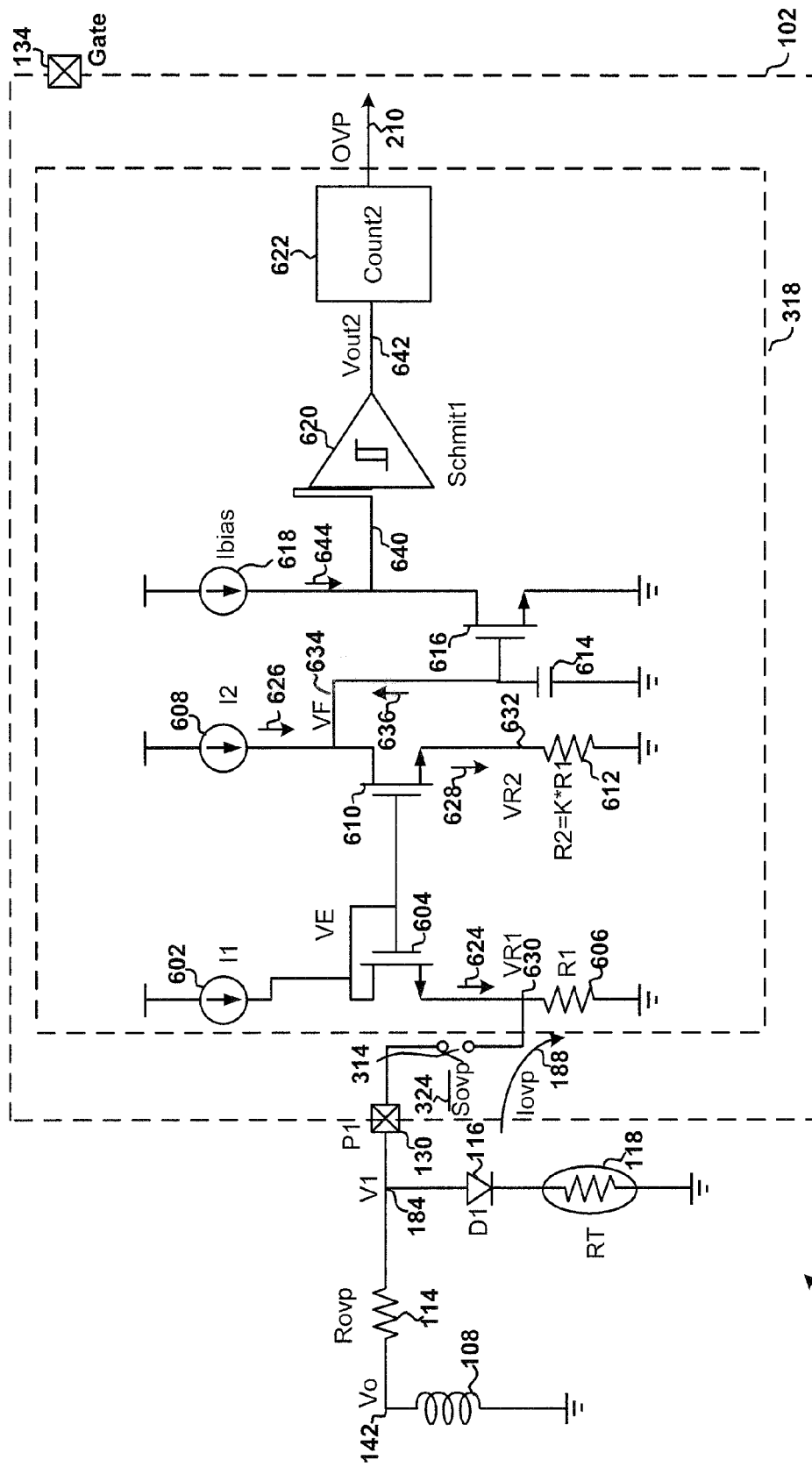
FIG. 7 is a simplified diagram showing certain components of an over-voltage-protection detector as part of a detection component in a power conversion system as shown in FIG. 2 according to one embodiment of the present invention.

FIG. 7 is a simplified diagram showing certain components of the OVP detector 318 as part of the detection component 202 in the power conversion system 100 according to one embodiment of the present invention. This diagram is merely an example, which should not unduly limit the scope of the claims. One of ordinary skill in the art would recognize many variations, alternatives, and modifications. As shown in FIG. 7, the OVP detector 318 includes current sources 602, 608 and 618, transistors 604, 610 and 616, resistors 606 and 612, a capacitor 614, a Schmitt trigger component 620, and a counter component 622. For example, the resistance of the resistor 612 is equal to the resistance of the resistor 606 times a predetermined parameter K (e.g., K>1, or K≤1).

According to one embodiment, the current source 602 is configured to provide a current 624 (e.g., I₁) to flow through the resistor 606, and the current source 608 is configured to provide another current 626 (e.g., I₂). For example, the current 624 and the current 626 are equal in magnitude to a reference current (e.g., $I_{ref}$). In another example, the current 624 and the current 626 are not equal in magnitude.

According to another embodiment, when the switch 314 is closed during a first time period (e.g., the time period $T_{OVP}$), the terminal 130 is configured to provide the current 188 to flow through the resistor 606. For example, under certain circumstances, the voltage signal 184 is equal in magnitude to a voltage 630 (e.g., $V_{R1}$) associated with the resistor 606 and/or a voltage 632 (e.g., $V_{R2}$) associated with the resistor 612, as follows:

$$V_1 = V_{R1} = (I_1 + I_{OVP}) \times R_1 = (I_{ref} + I_{OVP}) \times R_1$$

$$V_1 = V_{R2} = I_2 \times R_2 = I_{ref} \times K \times R_1 \quad \text{(Equation 11)}$$

where $V_{R1}$ represents the voltage signal 630, $I_1$ represents the current 624, $I_{OVP}$ represents the current 188, and $R_1$ represents the resistance of the resistor 606. In addition, $V_{R2}$ represents the voltage signal 632, $I_2$ represents the current 626, $R_2$ represents the resistance of the resistor 612, and $I_{ref}$ represents the reference current.

In another example, the voltage 630 (e.g., $V_{R1}$) is equal to the voltage 632 (e.g., $V_{R2}$) in magnitude. In one embodiment, if the voltage signal 142 increases in magnitude, the current 188 increases in magnitude, and the voltage signal 630 (e.g., $V_{R1}$) increases in magnitude. In another embodiment, if the voltage signal 142 increases in magnitude, the voltage 632 (e.g., $V_{R2}$) also increases in magnitude, and the current 628 increases in magnitude. As an example, if the voltage signal 630 (e.g., $V_{R1}$) exceeds a first voltage threshold, the current 628 becomes larger in magnitude than the current 626 provided by the current source 608. The capacitor 614 begins to discharge to provide a current 636 flowing through the transistor 610 and the resistor 612, according to certain embodiments. For example, the voltage 634 (e.g., $V_F$) decreases in magnitude. As an example, if the voltage 634 (e.g., $V_F$) becomes smaller than a second voltage threshold, the transistor 616 is turned off, in certain embodiments. In another example, an input signal 640 that is associated with the transistor 616 and a bias current 644 provided by the current source 618 increases in magnitude. In yet another example, the resistor R1 is chosen so that the voltage signal 630 (e.g., $V_{R1}$) is smaller in magnitude than a forward voltage of the diode 116.

$$V_{R1} = (I_1 + I_{OVP}) \times R_1 < V_f \quad \text{(Equation 12)}$$

where $V_f$ represents the forward voltage of the diode 116.

According to yet another embodiment, the Schmitt trigger component 620 is configured to receive the input signal 640 and generate a signal 642. For example, if the input signal 640 is smaller in magnitude than a first predetermined threshold, the Schmitt trigger component 620 is configured to output the signal 642 at a logic low level. On the other hand, if the input signal 640 becomes higher in magnitude than a second predetermined threshold as the voltage 634 (e.g., $V_F$) decreases in magnitude, the Schmitt trigger component 620 is configured to output the signal 642 at a logic high level. In another example, if the signal 642 is kept at the logic high level for a predetermined time period (e.g., a predetermined number of clock cycles), the counter component 622 outputs the OVP-detection signal 210 (e.g., at the logic high level) to trigger the OVP protection. Combining Equation 2 and Equation 11, the condition for OVP detection is determined as follows, according to certain embodiments:

$$V_o = (K-1) \times I_{ref} \times R_{OVP} + I_{ref} \times K \times R_1 \quad \text{(Equation 13)}$$

where $V_o$ represents the voltage signal 142 associated with the auxiliary winding 108. For example, the voltage signal 142 is related to the output voltage 198 as below.

$$V_o = \frac{N_{aux}}{N_{sec}} \times V_{out} \quad \text{(Equation 14)}$$

where $V_{out}$ represents the output voltage 198, and $N_{aux}/N_{sec}$ represents a turns ratio between the auxiliary winding 108 and the secondary winding 106.

According to one embodiment, a system controller for protecting a power conversion system includes, a first controller terminal configured to provide a drive signal to close and open a switch to affect a first current flowing through a primary winding of a power conversion system, the drive signal being associated with one or more switching periods including one or more first switching periods and one or more second switching periods, and a second controller terminal configured to receive one or more first input signals during the one or more first switching periods and receive one or more second input signals during the one or more second switching periods. The system controller is configured to, process information associated with the first input signals, determine whether a temperature associated with the power conversion system is larger than a predetermined temperature threshold based on at least information associated with the first input signals, and in response to the temperature associated with the power conversion system being larger than the predetermined temperature threshold, generate the drive signal to cause the switch open and remain open to protect the power conversion system. The system controller is further configured to, process information associated with the second input signals, determine whether an output voltage associated with a secondary winding of the power conversion system is larger than a predetermined voltage threshold based on at least information associated with the second input signals, and in response to the output voltage associated with the secondary winding of the power conversion system being larger than the predetermined voltage threshold, generate the drive signal to cause the switch to open and remain open to protect the power conversion system. For example, the system controller is implemented according to FIG. 2, FIG. 3, FIG. 4, FIG. 5, FIG. 6, and/or FIG. 7.

According to another embodiment, a system for protecting a power conversion system includes, a system controller including a first controller terminal configured to provide a drive signal to close and open a switch to affect a first current flowing through a primary winding of a power conversion system, and a second controller terminal configured to receive one or more input signals, the power conversion system further including a secondary winding and an auxiliary winding, the primary winding coupled to the secondary winding, a first resistor including a first resistor terminal and a second resistor terminal, the first resistor terminal being coupled to the second controller terminal, one or more first diodes including a first diode terminal and a second diode terminal, a first diode terminal being coupled to the second controller terminal, and a second resistor including a third resistor terminal and a fourth resistor terminal, the third resistor terminal being coupled to the second diode terminal. The second resistor terminal is configured to receive an output signal associated with the auxiliary winding coupled to the secondary winding. For example, the system is implemented according to at least FIG. 2, FIG. 4, and/or FIG. 7.

According to yet another embodiment, a system controller for protecting a power conversion system includes, a first controller terminal configured to provide a drive signal to close and open a switch to affect a first current flowing through a primary winding of a power conversion system, the drive signal being associated with one or more switching periods including a first switching period and a second switching period; and a protection component configured to receive a first voltage signal associated with a first input current flowing through a resistor during the first switching period and receive a second voltage signal associated with a second input current flowing through the resistor during the second switching period, the first input current and the second input current being different in magnitude. The protection component is further configured to, in response to a difference between the first voltage signal and the second voltage signal being larger than a predetermined threshold in magnitude, output a protection signal to generate the drive signal to cause the switch to open and remain open to protect the power conversion system. For example, the system controller is implemented according to at least FIG. 4, FIG. 5, and/or FIG. 6.

According to yet another embodiment, a system controller for protecting a power conversion system includes, a first controller terminal configured to receive an input current, a first resistor configured to receive a first current and the input current and generate a first voltage based on at least information associated with the first current and the input current, a second resistor configured to receive a second current and generate a second voltage based on at least information associated with the second current, and a processing component configured to, in response to the first voltage becoming larger than a first voltage threshold in magnitude, increase the second voltage in magnitude, discharge a capacitor coupled to the processing component, and decrease a third voltage in magnitude associated with the capacitor. For example, the system controller is implemented according to at least FIG. 7.

In one embodiment, a method for protecting a power conversion system includes, providing a drive signal to close and open a switch to affect a first current flowing through a primary winding of a power conversion system, the drive signal being associated with one or more switching periods including one or more first switching periods and one or more second switching periods, receiving one or more first input signals during the one or more first switching periods, processing information associated with the one or more first input signals, and determining whether a temperature associated with the power conversion system is larger than a predetermined temperature threshold based on at least information associated with the one or more first input signals. The method further includes, in response to the temperature associated with the power conversion system being larger than the predetermined temperature threshold, generating the drive signal to cause the switch open and remain open to protect the power conversion system, receiving one or more second input signals during the one or more second switching periods, processing information associated with the one or more second input signals, determining whether an output voltage associated with a secondary winding of the power conversion system is larger than a predetermined voltage threshold based on at least information associated with the one or more second input signals, and in response to the output voltage associated with the secondary winding of the power conversion system being larger than the predetermined voltage threshold, generating the drive signal to cause the switch to open and remain open to protect the power conversion system. For example, the method is implemented according to FIG. 2, FIG. 3, FIG. 4, FIG. 5, FIG. 6, and/or FIG. 7.

In another embodiment, a method for protecting a power conversion system includes, providing a drive signal to close and open a switch to affect a first current flowing through a primary winding of a power conversion system, the drive signal being associated with one or more switching periods including a first switching period and a second switching period, receiving a first voltage signal associated with a first input current flowing through a resistor during the first switching period, receiving a second voltage signal associated with a second input current flowing through the resistor during the second switching period, the first input current and the second input current being different in magnitude, and in response to a difference between the first voltage signal and the second voltage signal being larger than a predetermined threshold in magnitude, outputting a protection signal to generate the drive signal to cause the switch to open and remain open to protect the power conversion system. For example, the method is implemented according to at least FIG. 4, FIG. 5, and/or FIG. 6.

In yet another embodiment, a method for protecting a power conversion system includes, receiving an input current and a first current, processing information associated with the input current and the first current, and generating a first voltage based on at least information associated with the first current and the input current. The method additionally includes, receiving a second current, processing information associated with the second current, and generating a second voltage based on at least information associated with the second current. The method further includes, in response to the first voltage becoming larger than a first voltage threshold in magnitude, increasing the second voltage in magnitude, discharging a capacitor, and decreasing a third voltage in magnitude associated with the capacitor. For example, the method is implemented according to at least FIG. 7.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for protecting a power conversion system, the system controller comprising:
   a first controller terminal configured to provide a drive signal to close and open a switch to affect a first current flowing through a primary winding of a power conversion system, the drive signal being associated with one or more switching periods including one or more first switching periods and one or more second switching periods;

a second controller terminal configured to receive one or more first input signals during the one or more first switching periods and receive one or more second input signals during the one or more second switching periods; and an over-temperature-protection component configured to receive a first voltage signal associated with a first input current flowing through a first resistor during a third switching period of the one or more first switching periods and receive a second voltage signal associated with a second input current flowing through the first resistor during a fourth switching period of the one or more first switching periods, the first input current and the second input current being different in magnitude;

wherein the system controller is configured to:
process information associated with the one or more first input signals;
determine whether a temperature associated with the power conversion system is larger than a predetermined temperature threshold based on at least information associated with the one or more first input signals; and
in response to the temperature associated with the power conversion system being larger than the predetermined temperature threshold, generate the drive signal to cause the switch to open and remain open to protect the power conversion system;

wherein the system controller is further configured to:
process information associated with the one or more second input signals;
determine whether an output voltage associated with a secondary winding of the power conversion system is larger than a predetermined voltage threshold based on at least information associated with the one or more second input signals; and
in response to the output voltage associated with the secondary winding of the power conversion system being larger than the predetermined voltage threshold, generate the drive signal to cause the switch to open and remain open to protect the power conversion system;

wherein the over-temperature-protection component is further configured to, in response to a difference between the first voltage signal and the second voltage signal being larger than a first predetermined threshold in magnitude, output a protection signal to generate the drive signal to cause the switch to open and remain open to protect the power conversion system.

2. The system controller of claim 1 wherein the second controller terminal is further configured to receive the one or more first input signals during only a first part of the one or more first switching periods and receive the one or more second input signals during only a second part of the one or more second switching periods.

3. The system controller of claim 1 wherein the over-temperature-protection component is further configured to, in response to the difference between the first voltage signal and the second voltage signal being larger than the first predetermined threshold in magnitude, generate the protection signal to cause the switch to be opened without any modulation.

4. The system controller of claim 1 wherein the over-temperature-protection component is further configured to, in response to the difference between the first voltage signal and the second voltage signal being larger than the first predetermined threshold in magnitude, generate the protection signal to cause the switch to remain open for a first period of time larger in duration than one switching period of the one or more first switching periods.

5. The system controller of claim 1 is further configured to, in response to the output voltage associated with the secondary winding of the power conversion system being larger than the predetermined voltage threshold, generate the drive signal to cause the switch to be opened without any modulation.

6. The system controller of claim 1 is further configured to, in response to the output voltage associated with the secondary winding of the power conversion system being larger than the predetermined voltage threshold, generate the drive signal to cause the switch to remain open for a first period of time larger in duration than one switching period of the one or more second switching periods.

7. The system controller of claim 1 wherein:
the second controller terminal is coupled to a first resistor terminal of a second resistor, the second resistor further including a second resistor terminal;
the second controller terminal is coupled to a first diode terminal of one or more first diodes, the one or more first diodes further including a second diode terminal;
the second diode terminal is coupled to a third resistor terminal of the first resistor, the first resistor further including a fourth resistor terminal; and
the second resistor terminal is configured to receive an output signal associated with an auxiliary winding coupled to the secondary winding.

8. The system controller of claim 7 wherein the first resistor is a thermal resistor associated with a resistance changing with temperature.

9. The system controller of claim 8 wherein the resistance decreases with increasing temperature.

10. The system controller of claim 7 wherein:
the first diode terminal is an anode terminal; and
the second diode terminal is a cathode terminal.

11. The system controller of claim 1, further comprising:
a third controller terminal configured to receive a supply voltage;
a fourth controller terminal configured to receive a bias voltage;
a fifth controller terminal configured to receive a current-sensing signal related to the first current flowing through the primary winding; and
a sixth controller terminal configured to receive a feedback signal related to the output voltage.

12. The system controller of claim 11 wherein the system controller includes no other terminals.

13. The system controller of claim 11 wherein the first controller terminal, the second controller terminal, the third controller terminal, the fourth controller terminal, the fifth controller terminal, and the sixth controller terminal are six different pins respectively.

14. A system controller for protecting a power conversion system, the system controller comprising:
a first controller terminal configured to provide a drive signal to close and open a switch to affect a first current flowing through a primary winding of a power conversion system, the drive signal being associated with one or more switching periods including one or more first switching periods and one or more second switching periods;
a second controller terminal configured to receive one or more first input signals during the one or more first switching periods and receive one or more second input signals during the one or more second switching periods;

an over-temperature-protection component configured to receive a first voltage signal associated with a first input current flowing through a thermal resistor during a third switching period and receive a second voltage signal associated with a second input current flowing through the thermal resistor during a fourth switching period, the first input current and the second input current being different in magnitude, the first voltage signal and the second voltage signal being related to the one or more first input signals, the third switching period and the fourth switching period being among the one or more first switching periods; and an over-voltage-protection component configured to receive a third input current related to an output voltage during a fifth switching period, and in response to the third input current being larger than a predetermined current threshold, output an over-voltage-protection signal to generate the drive signal to cause the switch to open and remain open to protect the power conversion system, the output voltage being associated with a secondary winding of the power conversion system, the fifth switching period being among the one or more second switching periods, the third input current being related to the one or more second input signals;

wherein the system controller is configured to:
process information associated with the one or more first input signals;
determine whether a temperature associated with the power conversion system is larger than a predetermined temperature threshold based on at least information associated with the one or more first input signals; and
in response to the temperature associated with the power conversion system being larger than the predetermined temperature threshold, generate the drive signal to cause the switch to open and remain open to protect the power conversion system;

wherein the system controller is further configured to:
process information associated with the one or more second input signals;
determine whether the output voltage associated with the secondary winding of the power conversion system is larger than a predetermined voltage threshold based on at least information associated with the one or more second input signals; and
in response to the output voltage associated with the secondary winding of the power conversion system being larger than the predetermined voltage threshold, generate the drive signal to cause the switch to open and remain open to protect the power conversion system;

wherein the over-temperature-protection component is further configured to, in response to a difference between the first voltage signal and the second voltage signal being larger than a first predetermined threshold in magnitude, output an over-temperature-protection signal to generate the drive signal to cause the switch to open and remain open to protect the power conversion system.

15. The system controller of claim 14 wherein:
the over-voltage-protection component is further configured to provide a third voltage signal at the second controller terminal based on at least information associated with the third input current; and the thermal resistor includes a first resistor terminal and a second resistor terminal, the first resistor terminal being coupled to a first diode terminal of one or more diodes, the one or more diodes further including a second diode terminal coupled to the second controller terminal;

wherein the third voltage signal is smaller in magnitude than a forward voltage associated with the one or more diodes.

16. The system controller of claim 15 wherein:
the over-voltage-protection component includes a first resistor including a third resistor terminal and a fourth resistor terminal, the third resistor terminal being coupled to the second controller terminal; and
the third voltage signal is related to a resistance of the first resistor.

17. The system controller of claim 14 wherein the fifth switching period follows the third switching period and precedes the fourth switching period.

18. The system controller of claim 14 wherein the fifth switching period follows the third switching period and the fourth switching period or precedes the third switching period and the fourth switching period.

19. A system controller for protecting a power conversion system, the system controller comprising:
a first controller terminal configured to provide a drive signal to close and open a switch to affect a first current flowing through a primary winding of a power conversion system, the drive signal being associated with one or more switching periods including a first switching period and a second switching period; and
a protection component configured to receive a first voltage signal associated with a first input current flowing through a resistor during the first switching period and receive a second voltage signal associated with a second input current flowing through the resistor during the second switching period, the first input current and the second input current being different in magnitude;

wherein the protection component is further configured to, in response to a difference between the first voltage signal and the second voltage signal being larger than a predetermined threshold in magnitude, output a protection signal to generate the drive signal to cause the switch to open and remain open to protect the power conversion system;

wherein the protection component includes:
a first capacitor configured to receive the first voltage signal during the first switching period;
a second capacitor configured to receive the second voltage signal during the second switching period;
a comparator configured to receive a third voltage signal associated with the first voltage signal from the first capacitor, receive a fourth voltage signal associated with the second voltage signal from the second capacitor and output a comparison signal based on at least information associated with the third voltage signal and the fourth voltage signal; and
a counter component configured to receive the comparison signal and output the protection signal;

wherein the counter component is further configured to, in response to the comparison signal indicating that the difference between the first voltage signal and the second voltage signal being larger than the predetermined threshold for a predetermined time period, output the protection signal to generate the drive signal to cause the switch to open and remain open to protect the power conversion system.

20. The system controller of claim 19, further comprising a second controller terminal coupled to one or more diodes configured to receive the first input current and receive the second input current.

21. The system controller of claim 19 wherein the protection component is further configured to receive the first voltage signal during only a part of the first switching period.

22. The system controller of claim 19 wherein the protection component is further configured to receive the second voltage signal during only a part of the second switching period.

23. The system controller of claim 19 wherein the protection component is further configured to, in response to the difference between the first voltage signal and the second voltage signal being larger than the predetermined threshold in magnitude, generate the protection signal to cause the switch to be opened without any modulation.

24. The system controller of claim 19 wherein the protection component is further configured to, in response to the difference between the first voltage signal and the second voltage signal being larger than the predetermined threshold in magnitude, generate the protection signal to cause the switch to remain open for a first period of time larger in duration than the first switching period.

25. The system controller of claim 19 wherein the second switching period follows the first switching period, and is separated from the first switching period by one or more third switching periods.

26. The system controller of claim 19 wherein the second switching period immediately follows the first switching period.

27. The system controller of claim 19 wherein the protection component includes:
a first current-source component configured to provide the first input current; and
a second current-source component configured to provide the second input current.

28. The system controller of claim 19 wherein the protection component further includes:
an operational amplifier including a first input terminal, a second input terminal and an output terminal, the second input terminal being coupled to the output terminal;
wherein:
the first input terminal is configured to receive a reference signal;
the output terminal is configured to generate an output signal based on at least information associated with the reference signal;
the second capacitor includes a first capacitor terminal and a second capacitor terminal;
the first capacitor terminal is configured to receive the second voltage signal during the second switching period; and
the second capacitor terminal is configured to receive the output signal during the first switching period.

29. A system controller for protecting a power conversion system, the system controller comprising:
a first controller terminal configured to receive an input current;
a first resistor configured to receive a first current and the input current and generate a first voltage based on at least information associated with the first current and the input current;
a second resistor configured to receive a second current and generate a second voltage based on at least information associated with the second current;
a processing component configured to, in response to the first voltage becoming larger than a first voltage threshold in magnitude, increase the second voltage in magnitude, discharge a capacitor coupled to the processing component, and decrease a third voltage in magnitude associated with the capacitor;
a second controller terminal configured to provide a drive signal to close and open a switch to affect a third current flowing through a primary winding of a power conversion system; and
a detection component configured to detect the third voltage, and in response to the third voltage being smaller in magnitude than a second voltage threshold, output a protection signal to generate the drive signal to cause the switch to open and remain open to protect the power conversion system.

30. The system controller of claim 29 wherein the processing component includes:
a first current-source component configured to provide a fourth current;
a second current-source component configured to provide a fifth current;
a first transistor including a first transistor terminal, a second transistor terminal, and a third transistor terminal, the first transistor terminal being coupled to the second transistor terminal; and
a second transistor including a fourth transistor terminal, a fifth transistor terminal, and a sixth transistor terminal, the fifth transistor terminal being coupled to the second transistor terminal;
wherein:
the first transistor terminal is configured to receive the fourth current from the first current-source component;
the third transistor terminal is configured to output the first current;
the fourth transistor terminal is configured to receive the fifth current from the second current-source component; and
the sixth transistor terminal is configured to output the second current.

31. The system controller of claim 30 wherein the detection component includes:
a third current-source component configured to provide a sixth current;
a third transistor including a seventh transistor terminal, an eighth transistor terminal, and a ninth transistor terminal, the seventh transistor terminal being configured to receive the sixth current, the eighth transistor terminal being coupled to the capacitor and configured to receive the third voltage; and
a trigger-and-counter component configured to receive an output signal from the seventh transistor terminal and output the protection signal.

32. The system controller of claim 29 wherein the first voltage is equal in magnitude to the second voltage.

33. A method for protecting a power conversion system, the method comprising:
providing a drive signal to close and open a switch to affect a first current flowing through a primary winding of a power conversion system, the drive signal being associated with one or more switching periods including one or more first switching periods and one or more second switching periods;
receiving one or more first input signals during the one or more first switching periods;

processing information associated with the one or more first input signals;

determining whether a temperature associated with the power conversion system is larger than a predetermined temperature threshold based on at least information associated with the one or more first input signals; and in response to the temperature associated with the power conversion system being larger than the predetermined temperature threshold, generating the drive signal to cause the switch open and remain open to protect the power conversion system;

receiving one or more second input signals during the one or more second switching periods;

processing information associated with the one or more second input signals;

determining whether an output voltage associated with a secondary winding of the power conversion system is larger than a predetermined voltage threshold based on at least information associated with the one or more second input signals; and in response to the output voltage associated with the secondary winding of the power conversion system being larger than the predetermined voltage threshold, generating the drive signal to cause the switch to open and remain open to protect the power conversion system;

wherein the process of processing information associated with the one or more first input signals includes:
  receiving a first voltage signal associated with a first input current flowing through a resistor during a third switching period of the one or more first switching periods; and
  receiving a second voltage signal associated with a second input current flowing through the resistor during a fourth switching period of the one or more first switching periods, the first input current and the second input current being different in magnitude;

wherein the process of in response to the temperature associated with the power conversion system being larger than the predetermined temperature threshold, generating the drive signal to cause the switch open and remain open to protect the power conversion system includes:
  in response to a difference between the first voltage signal and the second voltage signal being larger than a first predetermined threshold in magnitude, outputting a protection signal to generate the drive signal to cause the switch to open and remain open to protect the power conversion system.

34. A method for protecting a power conversion system, the method comprising:

providing a drive signal to close and open a switch to affect a first current flowing through a primary winding of a power conversion system, the drive signal being associated with one or more switching periods including a first switching period and a second switching period;

receiving a first voltage signal associated with a first input current flowing through a resistor during the first switching period;

receiving a second voltage signal associated with a second input current flowing through the resistor during the second switching period, the first input current and the second input current being different in magnitude; and in response to a difference between the first voltage signal and the second voltage signal being larger than a predetermined threshold in magnitude, outputting a protection signal to generate the drive signal to cause the switch to open and remain open to protect the power conversion system;

wherein the process of receiving a first voltage signal associated with a first input current flowing through a resistor during the first switching period includes:
  receiving the first voltage signal during the first switching period by a first capacitor;

wherein the process of receiving a second voltage signal associated with a second input current flowing through the resistor during the second switching period includes:
  receiving the second voltage signal during the second switching period by a second capacitor;

wherein the process of in response to a difference between the first voltage signal and the second voltage signal being larger than a predetermined threshold in magnitude, outputting a protection signal to generate the drive signal to cause the switch to open and remain open to protect the power conversion system includes:
  receiving a third voltage signal associated with the first voltage signal from the first capacitor by a comparator;
  receiving a fourth voltage signal associated with the second voltage signal from the second capacitor by the comparator;
  outputting a comparison signal based on at least information associated with the third voltage signal and the fourth voltage signal;
  receiving the comparison signal; and
  in response to the comparison signal indicating the difference between the first voltage signal and the second voltage signal being larger than the predetermined threshold for a predetermined time period, outputting the protection signal to generate the drive signal to cause the switch to open and remain open to protect the power conversion system.

35. A method for protecting a power conversion system, the method comprising:

receiving an input current and a first current;
processing information associated with the input current and the first current;
generating a first voltage based on at least information associated with the first current and the input current;
receiving a second current;
processing information associated with the second current;
generating a second voltage based on at least information associated with the second current;
in response to the first voltage becoming larger than a first voltage threshold in magnitude,
  increasing the second voltage in magnitude;
  discharging a capacitor; and
  decreasing a third voltage in magnitude associated with the capacitor;
providing a drive signal to close and open a switch to affect a third current flowing through a primary winding of a power conversion system;
detecting the third voltage; and
in response to the third voltage being smaller in magnitude than a second voltage threshold, outputting a protection signal to generate the drive signal to cause the switch to open and remain open to protect the power conversion system.

36. A method for protecting a power conversion system, the method comprising:

providing a drive signal to close and open a switch to affect a first current flowing through a primary winding of a power conversion system, the drive signal being associated with one or more switching periods including one or more first switching periods and one or more second switching periods;

receiving one or more first input signals during the one or more first switching periods;

processing information associated with the one or more first input signals;

determining whether a temperature associated with the power conversion system is larger than a predetermined temperature threshold based on at least information associated with the one or more first input signals;

in response to the temperature associated with the power conversion system being larger than the predetermined temperature threshold, generating the drive signal to cause the switch to open and remain open to protect the power conversion system;

receiving one or more second input signals during the one or more second switching periods;

processing information associated with the one or more second input signals;

determining whether an output voltage associated with a secondary winding of the power conversion system is larger than a predetermined voltage threshold based on at least information associated with the one or more second input signals; and in response to the output voltage associated with the secondary winding of the power conversion system being larger than the predetermined voltage threshold, generating the drive signal to cause the switch to open and remain open to protect the power conversion system;

wherein the process of processing information associated with the one or more first input signals includes:
  receiving a first voltage signal associated with a first input current flowing through a thermal resistor during a third switching period; and
  receiving a second voltage signal associated with a second input current flowing through the thermal resistor during a fourth switching period, the first input current and the second input current being different in magnitude, the first voltage signal and the second voltage signal being related to the first input signals, the third switching period and the fourth switching period being among the one or more first switching periods;

wherein the process of in response to the temperature associated with the power conversion system being larger than the predetermined temperature threshold, generating the drive signal to cause the switch to open and remain open to protect the power conversion system includes:
  in response to a difference between the first voltage signal and the second voltage signal being larger than a first predetermined threshold in magnitude, output an over-temperature-protection signal to generate the drive signal to cause the switch to open and remain open to protect the power conversion system;

wherein the process of processing information associated with the one or more second input signals includes:
  receiving a third input current related to the output voltage during a fifth switching period, the fifth switching period being among the one or more second switching periods, the third input current being related to the second input signals;

wherein the process of in response to the output voltage associated with the secondary winding of the power conversion system being larger than the predetermined voltage threshold, generating the drive signal to cause the switch to open and remain open to protect the power conversion system includes:
  in response to the third input current being larger than a predetermined current threshold, outputting an over-voltage-protection signal to generate the drive signal to cause the switch to open and remain open to protect the power conversion system.

* * * * *